March 6, 1951

S. GILBERT ET AL 2,544,151

ELEMENT AND ACCESSORY OF POWER PLANTS

Filed Oct. 17, 1946

INVENTORS
SAMUEL GILBERT
JOHN R. ANDERSON
BY Frederic H. Miller
ATTORNEY

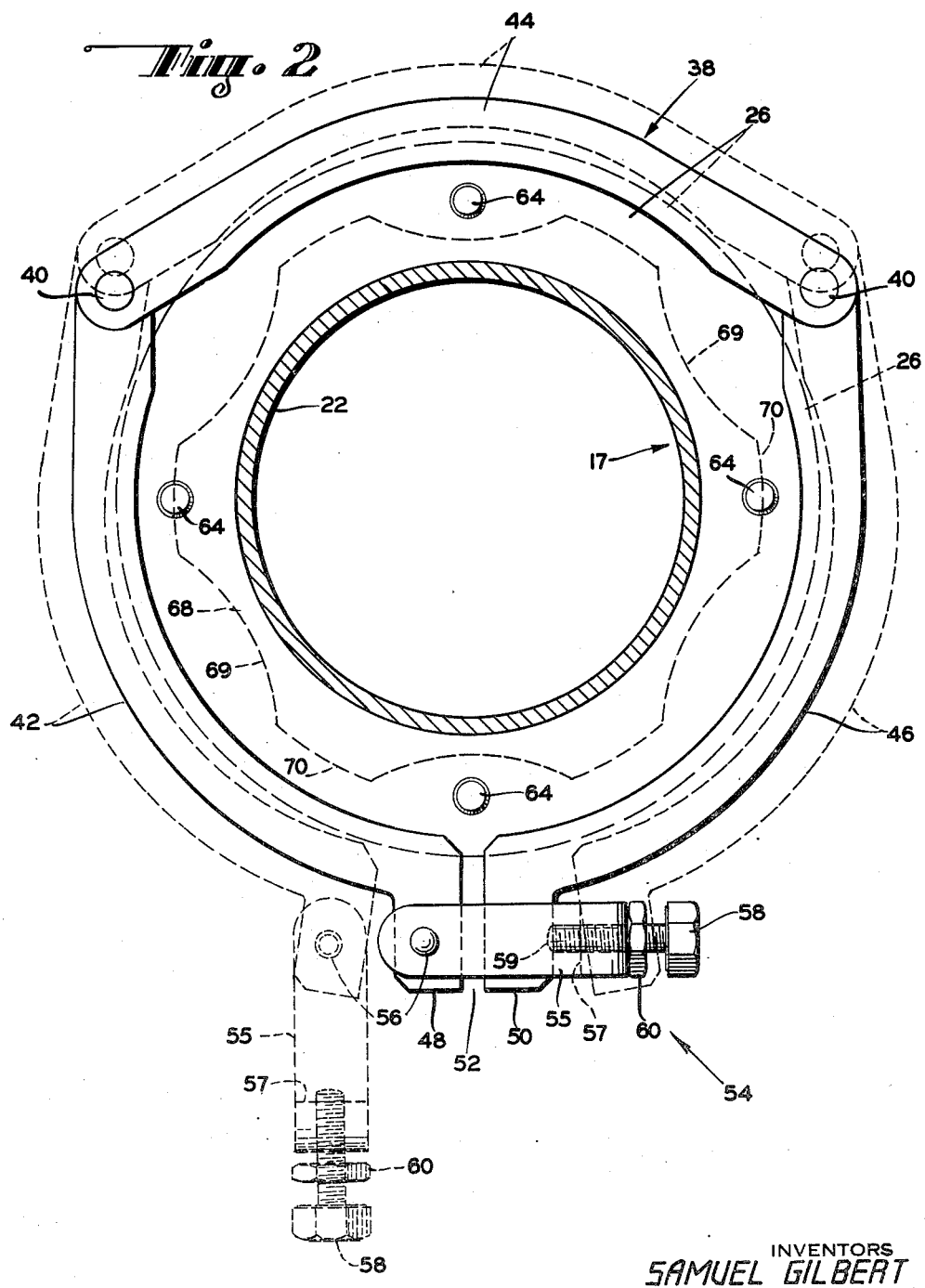

March 6, 1951  S. GILBERT ET AL  2,544,151
ELEMENT AND ACCESSORY OF POWER PLANTS
Filed Oct. 17, 1946  3 Sheets-Sheet 3
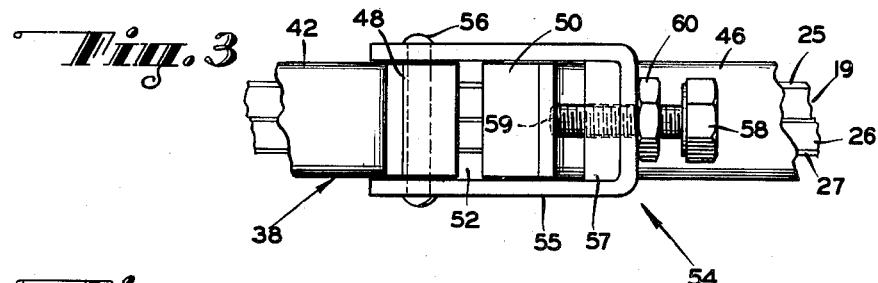
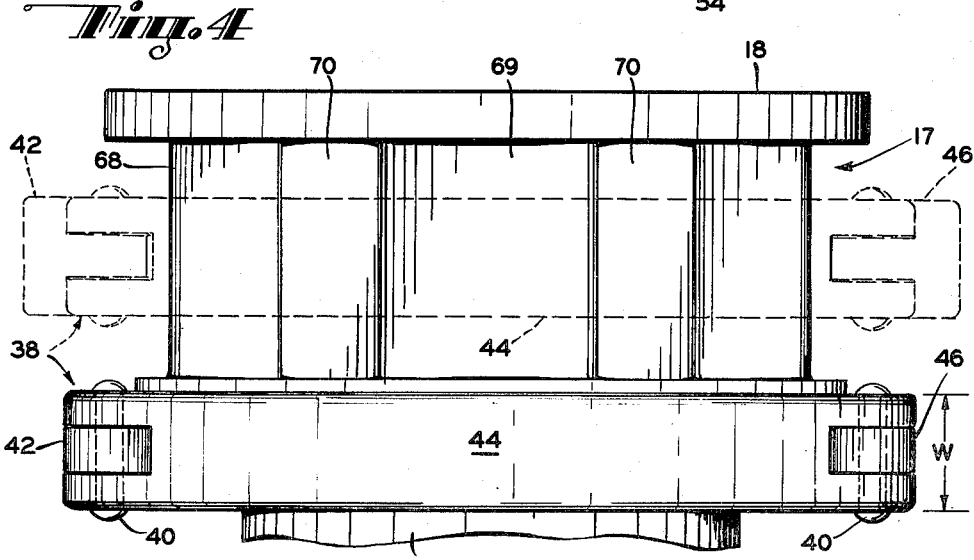
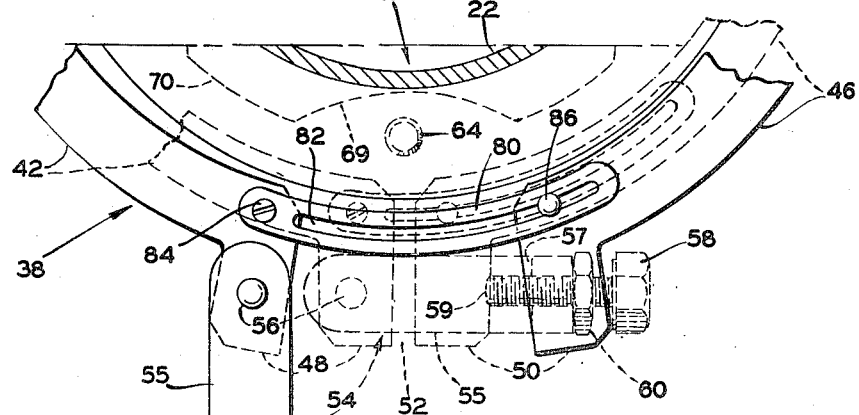
INVENTORS
SAMUEL GILBERT
JOHN R. ANDERSON
BY Frederic H. Miller
ATTORNEY Patented Mar. 6, 1951

2,544,151

UNITED STATES PATENT OFFICE 2,544,151

ELEMENT AND ACCESSORY OF POWER PLANTS

Samuel Gilbert, Cedar Grove, and John Raymond Anderson, Morristown, N. J., assignors to Bendix Aviation Corporation, Teterboro, N. J., a corporation of Delaware Application October 17, 1946, Serial No. 703,784

6 Claims. (Cl. 248—2)

The present invention relates to elements and accessories of power plants, and particularly to means for readily detachably connecting or mounting the elements and accessories of power operated means, such as aircraft engines.

The present invention is an improvement over the device of Patent No. 2,368,537, issued January 30, 1945, to Samuel Gilbert, one of the inventors hereof, on a Power Plant Accessory.

Although employable in other service, the example of apparatus for which the present invention is adapted, in this instance, is in connection with aircraft engines, on which are mounted parts, such as cylinders, and accessories, such as engine starters, and means driven by the engine including generators, fuel pumps, vacuum pumps, carburetors, and governors, and sometimes power take off means, cabin superchargers and other means.

In the case of a starter, it is usual to have an opening in the engine crank casing opposite an end of the crank shaft, and to mount the starter on the casing around this opening, which starter is provided with a clutch or jaw adapted for separable operative connection to a complemental jaw on the crank shaft. Also, it is usual to have a similar opening opposite a shaft driven by the engine above engine speed, and to mount a generator on the casing around the latter opening, which generator is provided with a rotor shaft adapted, as by a spline connection, for separable operative connection to the shaft of increased speed aforesaid.

An engine casing may have one or both of the above-mentioned openings for separately mounting the starter and the generator or, as has also heretofore been suggested, be provided with one opening for mounting a unit or accessory, which operates both as a starter and a generator. The other accessories are similarly provided for separable operative connection to elements driven by the engine.

In any case, in aircraft practice, it has heretofore been usual to provide mating ring-like mounting portions on the engine casing and accessory housing, respectively, in and around which ring-like portions are provided a series of axial holes for receiving mounting studs for connecting the accessory to the casing.

Since the crank casing and the accessory housing are sometimes both larger in diameter than the ring-like mounting portions, and disposed as close to each other as possible, it has been a difficult and time consuming job to manipulate the mounting studs, in both attaching the accessory to, and detaching it from, the engine. A time consuming feature of manipulating such studs is present whether the accessory is larger in diameter than its ring-like mounting portion, or not.

An object of the present invention is to provide a single split or closed ring which may retain its identity, or remain in its entirety, as such, both when it is in service, and when it is expanded for detachment of the accessory, without the separation therefrom of a single small or other part to perhaps become misplaced or lost.

Another object is to provide a single split or closed ring made up of rigid links or segments permanently pivoted to each other whereby to reduce the number of separable parts, render the ring capable of temporary mounting, when out of service, in convenient position for mounting an accessory or part, and to simplify and shorten the time of the mounting and detaching manipulation.

Another object is to provide a ring which, although it may remain in position as an intact unit throughout several accessory or part detaching and attaching operations, may itself be entirely removed from such position and installed or replaced by simple manipulation.

Another object is to better adapt one of the elements or structures, connected by the ring, to receive and retain the ring in temporary or operatively inactive position.

Another object is to provide a split or closed ring of the aforesaid character which is required to be expanded or opened from operative or closed condition by substantially a minimum amount, whereby to conserve side room at the accessory, and to provide for shifting the ring to temporary or inactive position.

Another object, in connection with an accessory or part which protrudes from its base or power operated means and is supported only at its base mounted end, is to reduce the cantilever strain on the quick detachable means represented by the aforesaid ring, whereby to reduce the likelihood of freezing, jamming or other effects tending to render it more difficult of removal.

Another object, in association with features of the above given objects, is to provide means whereby an accessory or part may be selectively positioned independently of the ring in any of a selection of defined positions relative to the structure on which it is to be mounted.

Another object, in a device having torque effects between the power operated means or base and an accessory or part mounted on the base, is to provide means for relieving the quick detachable means or ring of such torque effects.

Another object, in certain applications, is to combine, as one means, the aforesaid selective positioning feature with the above-mentioned feature of relieving the quick detachable means of torque effects.

Another object is to provide accessory mounting means whereby the accessory may be of substantially standard or other construction, as in the feature of having journal or supporting means for its rotor at its mounting end, and which supports the rotor when the accessory is detached from the power operated means.

Another object is to provide means of the above-indicated character that are simple and durable in construction, economical to manufacture and effective in their operation.

These and other objects and features of the invention are pointed out in the following description in terms of the embodiment thereof which is shown in the accompanying drawing. It is to be understood, however, that the drawing is for the purpose of illustration only, and is not designed as a definition of the limits of the invention, reference being had to the appended claims for this purpose.

In the drawings:

Figure 1 is a side view, partially in section and partially in elevation, of a portion of an accessory, such as an airplane engine starter, embodying elements of the present invention, together with a portion of an engine casing, and a rotative element in the casing, such as a clutch jaw on the crank shaft;

Figure 2 is a view, parts omitted, taken substantially along a line 2—2 of Figure 1, showing the aforementioned ring in full line operative condition, and broken line partially open condition, in the latter of which the ring may be shifted axially away from its operative position to a position indicated by broken lines in Figure 4 in which it is temporarily held in association with the engine, without opening the ring sufficiently to remove it entirely from the structure;

Figure 3 is a bottom view of parts shown at the bottom of Figure 2;

Figure 4 is a top view of a portion of the device of Figure 2; and

Figure 5 is a fragmentary view, similar to the bottom portion of Figure 2, showing a modification thereof.

Figure 1:
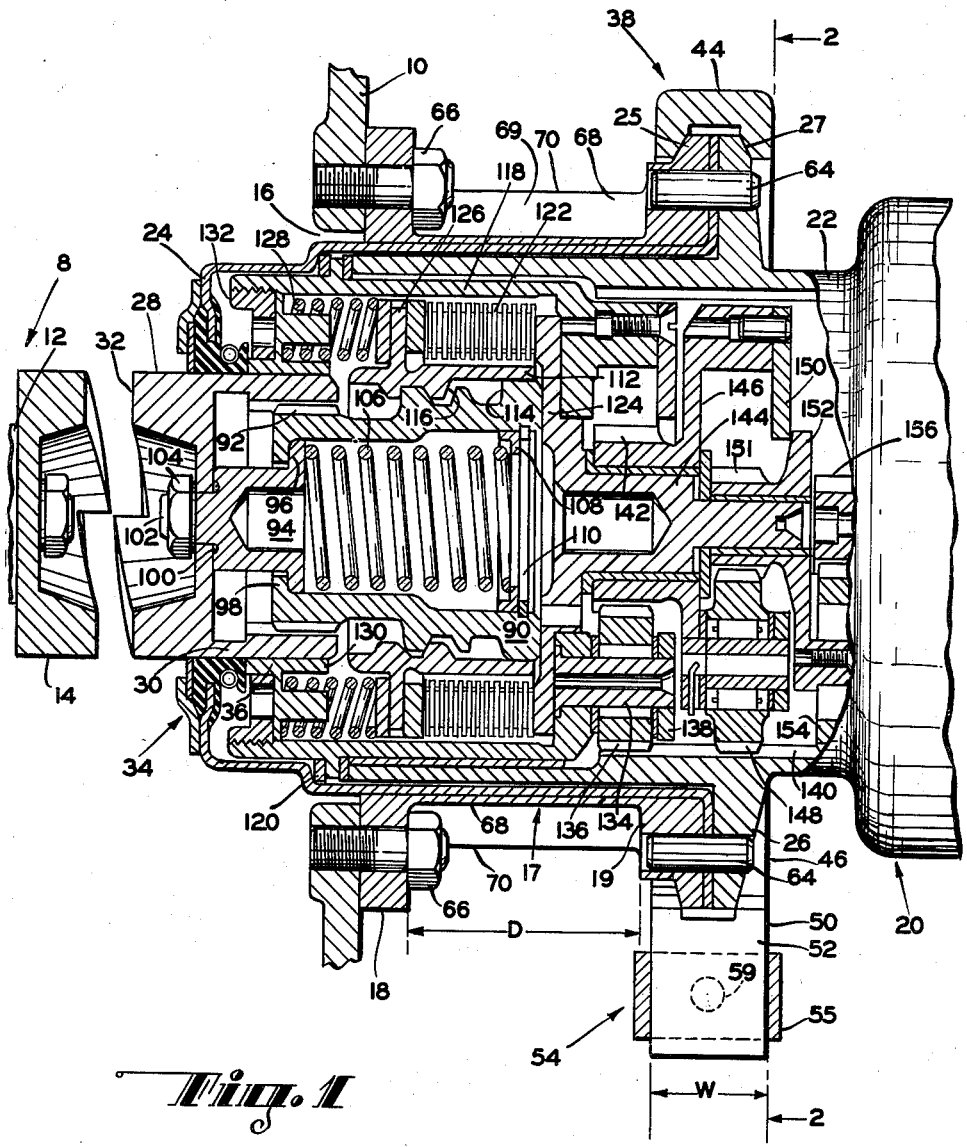

Referring to the drawing, which shows only sufficient structure for an understanding of the invention, power operated means 8, as illustrated, comprises, in general, an aircraft engine represented by portions of a crank case 10, an engine shaft 12, and a clutch jaw element 14, which is rotative about an axis directed through an opening 16 of the casing 10.

The invention which is adapted as a combination for cooperation with such power operated means, comprises in general, an adapter or cylindrical extension 17 of the casing 10 around the opening 16 having a radially outer flange 18 next to the engine and a radially outer flange 19 spaced from the casing 10, which flange 19 constitutes a shoulder or holding means for an accessory or engine starter 20. The latter comprises a housing portion 22 having an end 24 adapted for insertion into the extension 17, and includes a radially outer flange or shoulder 26 constituting retaining means for position adjacent to the flange or holding means 19. The flanges 19 and 26 are provided with chamfers or bevel margins 25 and 27 at the axially remote sides thereof, respectively, at angles, in this instance, of about fifteen degrees to the radial plane of the flanges. A rotary means or member 28 axially aligned with the jaw element 14, has a shank portion 30 in, and adapted to extend from, the housing 22 into the casing 10 for separably operatively connecting a jaw portion 32 to the engine jaw element 14. Means, such as a combined friction and seal ring 34, and/or a ring 36, rotatably support the rotary means 28 adjacent to the end 24, and also support the means 28 when the accessory or starter 20 is detached from the power operated means or engine 8.

A split ring 38 of less axial extent or rim width W, see Figure 1, than the distance D of the holding means or flange 19 from the flange 18, comprises, in this instance, three rigid links pivotally connected, as by pins 40 in end-to-end relation to each other, and includes at least one intermediate link 44, and end links 42 and 46, the free ends 48 and 50, respectively, of the latter of which define a ring split 52.

The ring 38, by having the links 42, 44 and 46 of inwardly opening channel section, in this instance, and by having the links connected by the pivot pins 40 is adapted for movement opening the ring and the split 52, laterally of the direction of the axes of the element 14 and the means 28, providing for placing the ring about the holding means 19 and the retaining means 26. The reverse or closing movement of the ring provides for placing the ring 38 with its channel section in position interlocking the holding means 19 and the retaining means 26 together in the direction of the aforesaid axes.

Axially opposite inner side surfaces of the link channels conform to the chamfers 25 and 27 to produce a wedging action forcing the flanges 19 and 26 tightly together.

Releasable means 54 cooperates with the free link ends 48 and 50 to maintain the ring 38 in the aforesaid interlocking position, and pins 64 press fitted in the holding means 19 and slip fitting holes in the retaining means 26 assume torque effects between the power operated means 8 and the accessory 20, thus relieving the ring 38 of such effects, and rendering it unnecessary to depend solely on the ring to maintain the parts in position against the torque.

The means 54 comprises a yoke 55 pivotally connected to the end 48, as by a pin 56, and having a nut 57 secured in the closed end thereof for the reception of a bolt 58 cooperating with a depression 59 in the end 50 and carrying a lock nut 60.

The adapter 17, in this instance, is secured to the casing 10, as by studs 66, but may be constituted as an integral extension of the casing 10 or of the casing of other power operated means, in which form, the distance D, Figure 1, may be the distance between the casing 10 and the holding means or flange 19, instead of the distance between the flange 18 and the flange 19.

The adapter 17, also in this instance, is cylindrical and of radially outwardly opening axial substantially channel section, the channel of which is defined by the flanges 18 and 19 and a cylindrical body portion 68. The latter is milled to form outer surface depressions 69, in and along which the studs 66 are moved to position attaching the adapter to the casing 10, and which depressions 69 define ribs 70 which provide cantilever strength.

The accessory or starter 20 has, in this example, a free end, or end of the accessory outwardly from the engine to the right, beyond the limits of the drawing as viewed in Figure 1, which is unsupported, such that if the ring 38 were close to the engine, it would be subject to greater cantilever strain, which as hereinabove suggested may cause freezing or jamming of the ring rendering it difficult to remove. In this respect, an important feature of the invention resides in making the extension 17 of substantial length to relieve the ring 38 of such strain, and render it easy of removal.

In addition to its function of relieving the cantilever strain on the ring 38, since the width W of the latter is less than the distance D, when the ring is opened only partially, as indicated in broken lines in Figure 2, or just enough for all of the inner peripheral parts of the ring to radially clear the flanges 19 and 26, the ring may be shifted axially toward the engine and temporarily disposed on the adapter in the space W, as indicated in broken lines in Figure 4, where it is maintained axially by the flanges 19 and 26 irrespective of whether the apparatus is horizontal or tilted along the axis.

The partial opening of the ring aforesaid, is in this instance reduced materially over the corresponding amount of opening which would be required of a two-link ring for the same purpose.

By reason of the construction and operation of the means 54, not a single small or other part of the ring need be separated from the structure as a loose or separate part for possible misplacement or loss resulting in delay from such cause.

The accessory or starter 20, Figure 1, further comprises a hollow screw shaft 90 having a spline connection 92 to the rotary means or jaw member 28 for rotation therewith and axial movement relative thereto. A meshing rod or member 94 has a flange 96 behind a flange 98 of the screw shaft 90, a sealing ring 100 in a groove of a shoulder facing the member 28 and a portion 102 extending through the member 28 on which is fixed a nut 104 compressing the sealing ring 100 and holding the member 28 to the member 94. A spring 106, in the shaft 90 and through the intermediary of which the shaft acts when it pushes the member 28 for engagement with the engine jaw element 14, is disposed between the member 94 and a spring backing ring 108, which is held in place by a split locking ring 110 in a groove of the shaft 90.

The shaft 90 has long lead screw thread relation to an axially stationary rotative nut 112 therein, and has a shoulder 114 for engagement with a shoulder 116 of the nut 112 to cause rotation of the member 28. A drum or barrel 118, rotatively mounted about the nut 112 in radially spaced relation thereto and held axially by means 120, is held to the nut by a friction disc pack 122, discs of which are splined to the barrel and the nut, respectively, between a barrel outer end closure member 124 and a flange 126 of the nut having a thrust ring at each side. The ring 36 has centering posts for springs 128 and a bearing portion 130 rotatively supporting the member 28 during starting of the engine and maintaining the member 28 in position when the starter is detached from the engine. A ring nut 132 screw threadedly mounted in the open inner end of the barrel 118 is adapted to adjust tension of the springs 128 and the friction between the discs of the pack 122.

The barrel 118 has outer end trunnions 134 supporting planet gears 136 held by a ring plate 138 and engaging an orbital gear 140 constituting, in this instance, a fixed integral part of the housing 22.

The planet gears 136 engage a sun gear 142 journaled on a trunnion extension 144 of the barrel closure member 124 and having a plate portion 146 carrying planet gears 148 also engaging the orbital gear 140. A ring plate 150 holds the planet gears 148 in position.

The trunnion extension 144 carries a sun gear portion 151 of a member 152, which sun gear 151 engages the planet gears 148 and which member 152, in turn, carries planet gears 154, which engage the orbital gear 140 and a sun gear or pinion 156 carried by the shaft of the motor in the housing 22.

In the operation of dismounting the accessory 20, assuming the parts to be mounted as indicated in Figure 2, the lock nut 60 and the bolt 58 are unscrewed to the right, as viewed in the figure, by a distance only sufficient to remove the bolt from the depression 59 to a position in which it clears the end 50 when the yoke 55 pivots about the axis of the pin 56, whereupon the ring 38 may be opened to the position indicated by broken lines, in which it clears the flanges 19 and 26 over which it may be passed axially toward the power operated means or engine 8 to the broken line position of Figure 4. The accessory 20, will, of course, be separately held, as aided by the pins 64, and removed after the ring is expanded as aforesaid. A new accessory may be immediately placed in position on the pins 64, and the ring 38 as quickly returned to position interlocking the flanges 19 and 26, whereupon the means 54 will be restored to the condition indicated in full lines.

The pins 64, shown as four in number, press fitted into the flange 19, slip fitted into the flange 26, and equally spaced about the flanges, in this instance, may, of course be of other number and spacing and have certain of them press or slip fitted into either or both of the flanges 19 and 26.

A practical example of the pin arrangement is illustrated, in which the four pins 64 are equally spaced from each other, for cooperation with four or any feasible multiple of four holes for slip receiving the pins, whereby the accessory 20 may be arranged about its axis, as viewed in Figure 2, in any one of a selection of positions.

In the operation of the starter accessory 20, when the motor is energized, rotation of the motor armature shaft pinion 156 is transmitted to the planet gears 154 which, since they engage the stationary orbital gear 140, react by turning the member 152 and the sun gear 151. Turning of the latter, causes the planet gears 148 to react against the orbital gear 140 to turn the plate 146 and the sun gear 142, which, since it engages the planet gears 136, which also engage the orbital gear 140, causes a reaction turning the barrel 118.

The first turning of the barrel 118 is transmitted through the friction disc pack 122 to the nut 112, and since the rotary means 28 is frictionally held by the friction seal ring 34, and splined to the means 28 by the connection 92, this first turning will cause the screw shaft 90 to axially shift the means 28 to the left, as seen in Figure 1, through the intermediary of the spring 106 to engage the jaw member 32 to the engine jaw element 14.

When the jaws 32 and 14 mesh, and the shoulder 114 engages the shoulder 116, continued turning of the nut 112 acts through the spline connection 92, to turn the jaws to normally start the engine.

When the engine starts, the jaw element 14 overrides the jaw member 32 against the action of the spring 106, and when the starter motor is deenergized, the jaw 14 cams the means 28 in a usual manner back to the original position indicated. If the engine shaft 12, for any reason, abnormally resists turning, or if the engine backfires, the reaction is absorbed in the starter by the disc clutch pack 122.

Referring to Figure 5, in which corresponding parts are designated by corresponding reference numerals, the modification therein shown is the same as the structure above described, except for the addition of a link or links 80, each of which, in this instance, is curved to the contour of the ring 38, has an arcuate slot 82, is pivotally mounted, at one end, on the ring end 48, as by a pin 84, and has a headed pin 86, in the ring end 50, extending through the slot 82.

The link 80, as shown, provides for opening the ring 38 to a greater extent than necessary to closely clear the flanges 19 and 26, and renders the ring an expansible entirely closed ring, which is ensured to a greater extent from accidental displacement from its temporary position between the flanges 19 and 26. The link 80, which of course could be straight is, in this instance, curved, as shown, so that it will remain within the contour of the ring, and not have its end, at the right, as shown, protruding from such contour for possible damage to the link.

Although only two embodiments of the invention have been illustrated and described, various changes in the form and relative arrangements of the parts, which will appear to those skilled in the art, may be made without departing from the scope of the invention. Reference is, therefore, to be had to the appended claims for a definition of the limits of the invention.

What is claimed is:

1. In means adapted for readily detachably mounting an accessory on power operated means, the latter including a casing, and an element in the casing rotative about an axis directed through an opening of the casing, the combination of means adapted to constitute a cylindrical extension of the casing around said opening having a radially outer flange adapted to be spaced axially outwardly from the casing constituting accessory holding means, an accessory comprising a housing having an end adapted for insertion into said extension and including a radially outer flange spaced axially outwardly from said end constituting retaining means for position adjacent to said holding means, said flanges having remote side chamfers, rotary means having a portion in said housing and a portion adapted for separable operative connection to said element, means for rotatably supporting said rotary means adjacent to said end and adapted to support the rotary means when the accessory is detached from the power operated means, a split ring of inwardly opening channel section, inner channel sides of which slope according to said chamfers, said ring being of less axial extent than the distance of said holding flange from the casing and comprising rigid links pivotally connected in end-to-end relation to each other and including at least one intermediate link and end links the free ends of the latter of which define the ring split, said ring being adapted for operative position wedgingly interlocking said holding and retaining means together in the direction of said axis, releasable means carried by said ring at all times and operative across said split for maintaining said ring in said interlocking position, means constituting a part of said ring permanently bridging said split and providing for extension of the ring to radially clear said holding and retaining means, and means operative between said holding and retaining means providing for adjustably locating and temporarily positioning the accessory relative to said power operated means and for relieving said ring of torque effects between the power operated means and the accessory.

2. In means adapted for readily detachably mounting an accessory on power operated means, the latter including a casing, and an element in the casing rotative about an axis directed through an opening of the casing, the combination of means adapted to constitute a cylindrical extension of the casing around said opening having a radially outer flange adapted to be spaced axially outwardly from the casing constituting accessory holding means, an accessory comprising a housing having an end adapted for insertion into said extension and including a radially outer flange spaced axially outwardly from said end constituting retaining means for position adjacent to said holding means, rotary means having a portion in said housing and a portion adapted for separable operative connection to said element, means for rotatably supporting said rotary means adjacent to said end and adapted to support the rotary means when the accessory is detached from the power operated means, a split ring of less axial extent than the distance of said holding flange from the casing and comprising rigid links pivotally connected in end-to-end relation to each other and including at least one intermediate link and end links the free ends of the latter of which define the ring split, said ring being adapted for operative position interlocking said holding and retaining means together in the direction of said axis, releasable means cooperating with said free ends for maintaining said ring in said interlocking position, and means operative between said holding and retaining means for relieving said ring of torque effects between the power operated means and the accessory.

3. In means adapted for readily detachably mounting an accessory on power operated means, the latter including a casing, and an element in the casing rotative about an axis directed through an opening of the casing, the combination of means adapted to constitute an extension of said casing about said opening having accessory holding means, an accessory comprising a housing having an end adapted for position along said extension and including retaining means for position adjacent to said holding means, rotary means in said housing having a portion adapted for separable operative connection to said engine element, means for rotatably supporting said rotary means adjacent to said end and adapted to support the rotary means when the accessory is detached from the engine, an extensible ring of less axial extent than the distance between the engine casing and said holding means, said ring being adapted for operative position interlocking said holding and retaining means together in the direction of said axis, and releasable means cooperating with portions of said ring for maintaining the ring in said interlocking position and providing for extension of the ring radially clearing said holding and retaining means for axial movement of the ring to a position removed from said holding means on said extension.

4. In means adapted for readily detachably mounting an accessory on power operated means, the latter including a casing and an element in the casing rotative about an axis directed through an opening through a wall opening of the casing, the combination of means adapted to constitute a cylindrical extension of the casing around said opening having radially outer holding means, an accessory housing having radially outer retaining means, an extensible ring adapted for operative position interlocking said holding and retaining means together in the direction of said axis, and releasable means for tightening the ring in said interlocking position and providing for its extension to radially clear said holding and retaining means, the space on said cylinder between said casing and said holding means adapting the cylinder to receive said ring in inactive position in said space.

5. In means adapted for readily detachably mounting an accessory on power operated means, the latter including holding means and a rotative element, the accessory having retaining means extending laterally of the axis of said rotary means, a single-split ring comprising rigid links constituting substantially equal segments of the ring pivotally connected in end-to-end relation to each other and including at least one intermediate link and end links, the free ends of the end links of which define the ring split, said ring being adapted for operative position interlocking the holding means of said power operated means to the accessory retaining means in the direction of said axis.

6. In means adapted for readily detachably mounting an accessory on power operated means, the latter including holding means, the accessory having retaining means, a ring having a single split only and comprising three rigid links constituting substantially equal segments of the ring axially pivotally connected in end-to-end relation and including a pair of link free ends defining said single split, said ring being adapted for operative position interlocking the holding means of the power operated means to the accessory retaining means in the direction of the axis of the ring, and releasable means operative across said split for maintaining the ring in said interlocking position.

SAMUEL GILBERT.
JOHN RAYMOND ANDERSON.

REFERENCES CITED

The following references are of record in the file of this patent:

UNITED STATES PATENTS

| Number | Name | Date |
| --- | --- | --- |
| 1,093,868 | Leighty | Apr. 21, 1914 |
| 1,603,412 | Rohde | Oct. 19, 1926 |
| 2,368,537 | Gilbert | Jan. 30, 1945 |